(12) United States Patent
Gunston et al.

(10) Patent No.: US 7,558,292 B2
(45) Date of Patent: Jul. 7, 2009

(54) REDUNDANT TIME SYNCHRONIZATION (75) Inventors: Kenneth Arthur Gunston, Arrowsic, ME (US); Krishna Rao Mendu, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 520 days.

(21) Appl. No.: 11/507,331

(22) Filed: Aug. 21, 2006

(65) Prior Publication Data

US 2007/0076765 A1    Apr. 5, 2007

Related U.S. Application Data (60) Provisional application No. 60/709,580, filed on Aug. 19, 2005.

(51) Int. Cl.
*H04J 3/06* (2006.01)
*H04B 7/005* (2006.01)
*H04L 7/00* (2006.01)

(52) U.S. Cl. .................. 370/507; 370/278; 370/509; 375/356; 713/400

(58) Field of Classification Search ......... 370/229–240, 370/278, 282, 301, 350, 503–520; 375/354–361; 713/400–401, 500–503, 600
See application file for complete search history.

(56) References Cited

U.S. PATENT DOCUMENTS 4,893,318 A * 1/1990 Potash et al. ................. 375/358
5,257,404 A * 10/1993 Goreham et al. ............. 455/503
5,912,886 A * 6/1999 Takahashi et al. ........... 370/350

* cited by examiner

*Primary Examiner*—Tri H Phan
(74) *Attorney, Agent, or Firm*—Leydig, Voit & Mayer, Ltd (57) ABSTRACT

Disclosed is a time-synchronization algorithm for use among disparate systems, such as between a controller system and a system having one or more application workstations. In an embodiment of the invention, the workstation system acts as a master timekeeper, ensuring that the time stored in the controller system is in synchrony with the time kept by the workstation system. In a further embodiment of the invention, the time-synchronization system provides staggered time-synchronization signals from each of two or more workstations for receipt by the controller system. The controller system sets its local time by resetting the time for each such incoming synchronization signal. In a further embodiment of the invention, each of two or more workstations employs a technique for evaluating the error accumulated in the controller's time clock and transmits a time-synchronization message in response to finding that the accumulated error has exceeded a predetermined acceptable error threshold.

9 Claims, 7 Drawing Sheets

REDUNDANT TIME SYNCHRONIZATION

CROSS-REFERENCE TO RELATED APPLICATION

This application claims priority to U.S. Provisional Patent Application 60/709,580, "Triconix Redundant Time Synchronization," which was filed on Aug. 19, 2005, and which is incorporated herein by reference in its entirety.

FIELD OF THE INVENTION

The present invention is related generally to coordination among multiple systems, and, more particularly, to time synchronization among multiple systems.

BACKGROUND OF THE INVENTION

Many industrial and other processes rely on accurate timing of processes and data flow. For example, steps may need to be taken in a certain sequence or with certain timing, and accurate clock information is critical in such situations. Problems with time synchronization can arise especially when different systems are integrated or operated together and must operate on a common clock. Although it is possible to simply transmit a clock signal from one system to another, this technique leaves the system vulnerable to falling out of synchronization due to a disruption of the line carrying the clock signal or the machine supplying the signal.

An example of integration wherein time synchronization is important is in integrating different control systems together to control a single process or set of processes.

BRIEF SUMMARY OF THE INVENTION

In view of the foregoing, the present invention provides a time-synchronization algorithm for use among disparate systems, such as between a controller system such as a Triconex Tricon/Trident and a system having one or more application workstations, such as Foxboro I/A workstations. The time-synchronization algorithm disclosed herein is also applicable to other environments. In an embodiment of the invention, the workstation system acts as a master timekeeper, ensuring that the time stored in the controller system is in synchrony with the time kept by the workstation system. In an embodiment of the invention, the controller system protocol handlers are modified to accommodate the time-synchronization algorithm.

In a further embodiment of the invention, the time-synchronization system provides staggered time-synchronization signals from each of two or more workstations for receipt by the controller system. The controller system sets its local time in an embodiment of the invention by resetting the time for each such incoming synchronization signal. In a further embodiment of the invention, each of two or more workstations employs a technique for evaluating the error accumulated in the controller's time clock and transmits a time-synchronization message in response to finding that the accumulated error has exceeded a predetermined acceptable error threshold.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the present invention is illustrated as being implemented in a suitable environment. The following description is based on embodiments of the invention and should not be taken as limiting the invention with regard to alternative embodiments that are not explicitly described herein.

In embodiments of the invention, a time-synchronization algorithm is provided for clock synchronization between two disparate systems, such as between a controller system and a system having one or more application workstations. Although the illustrated examples pertain primarily to integration of the Triconex controller system with a workstation system such as the Foxboro I/A system, it will be appreciated that the time-synchronization method and system described herein are also applicable to other environments.

Figure 1:
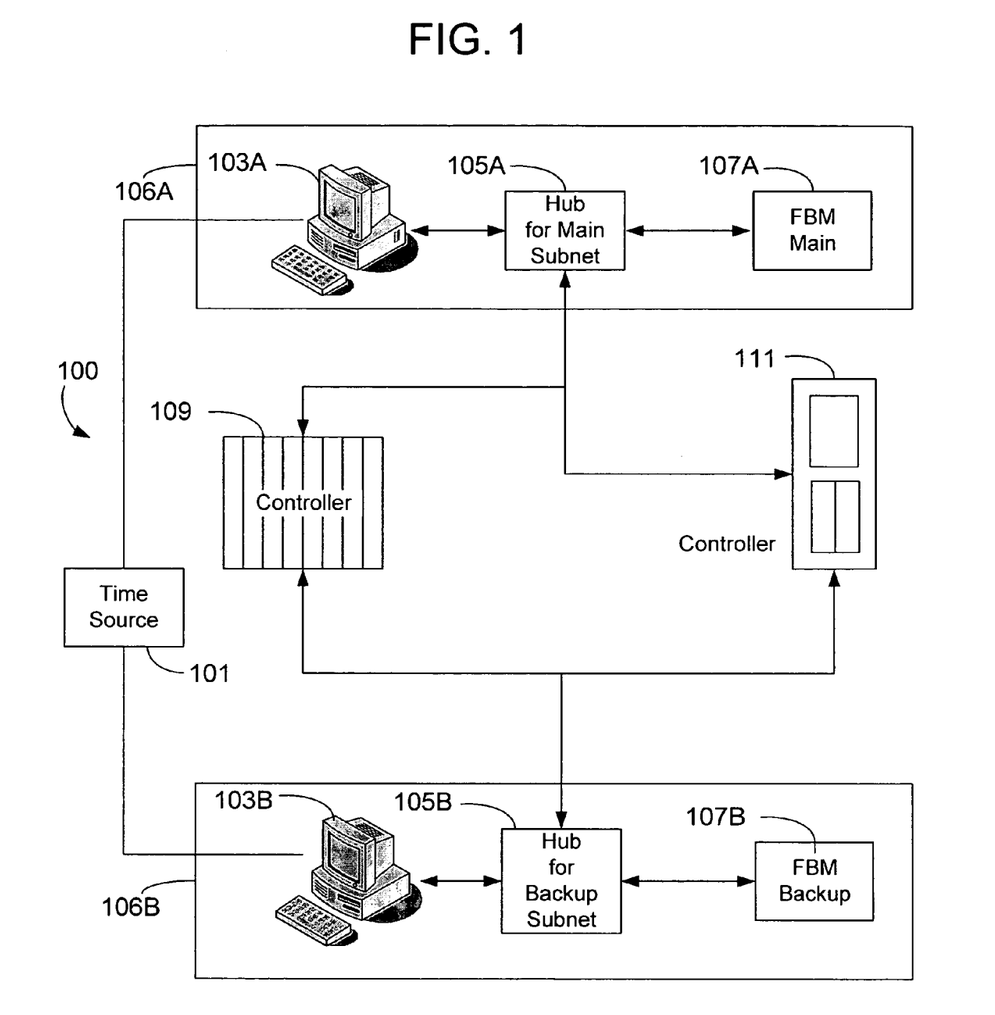
FIG. 1 is a schematic diagram of a redundantly synchronized integrated system according to an embodiment of the present invention.

FIG. 1 is a schematic illustration of a redundant, time-synchronization system employed between an application workstation system and two controller systems. As shown, a time source 101 is used to provide a time-synchronization signal for the entire system 100. The system 100 further includes two workstations 103A, 103B and two hubs 105A, 105B associated with the two workstations 103A, 103B, respectively, and with a primary subnet 106A and a backup subnet 106B, respectively.

Each subnet typically includes at least one fieldbus module 107A, 107B. In addition, the system 100 contains a number of controllers such as, for example, a Tricon controller 109 and a Trident controller 111. The Tricon controller 109 and the Trident controller 111 are connected via the hub 105A to the application workstation 103A. The controllers 109, 111 are also connected via the hub 105B to the application workstation 103B.

The time source 101 provides a timing signal to each of the workstations 103A, 103B. This establishes the timing for the subnet 106A and for the backup subnet 106B from a common source. As is discussed in greater detail below, the workstations 103A, 103B provide time-synchronization signals to the controllers 109, 111 in an embodiment of the present invention. Because there are redundant FDSIs or PCs, each talks to one of the redundant communication cards in a controller 109, 111.

In other words, in an embodiment of the present invention, the workstation system (comprising the workstations 103A, 103B) acts as master timekeeper, ensuring that the time stored in the controller system (comprising the controllers 109, 111) is in synchrony with the time kept by the workstation system. In an embodiment of the present invention, the controller system protocol handlers are modified to incorporate a time-synchronization algorithm such as that discussed in greater detail below. Although it is not required, a device configuration file can be used to specify the time, for example the minute of each hour, at which the time-synchronization process begins.

In order to check the controller system time and to adjust the controller time, four basic functions are used, including Read Controller Clock, Read Controller Clock Response, Adjust Controller Clock, and Adjust Controller Clock Response. Although the names and details of these types of functions may differ for different controller systems, similar functions will be typically provided to read and adjust the controller clock. In the Tricon system, the analogous functions are Read Tricon Clock, Read Tricon Clock Response, Adjust Tricon Clock, and Adjust Tricon Clock Response.

Figure 2A:
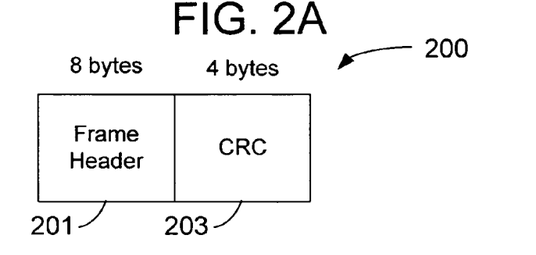
FIG. 2A is a packet data structure diagram of a Read Clock message usable in an embodiment of the present invention.

A Read Controller Clock message is sent to request that the current time on the controller be sent to the requester, e.g., an application workstation. The controller responds with a Read Controller Clock Response which sends the current time to the requester. Although not required, the Read Controller Clock message can have a form as shown in the example of FIG. 2A, e.g., a data structure 200 having a frame header 201 of eight bytes and a CRC field 203 of four bytes.

Figure 2B:
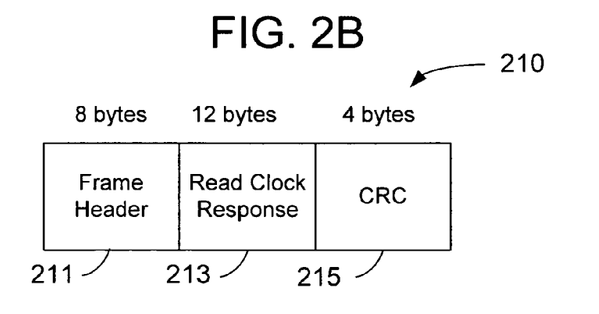
FIG. 2B is a packet data structure diagram of a Read Clock Response message usable in an embodiment of the present invention.

A Read Controller Clock Response message carries the current controller time to the requester in response to a Read Controller Clock request. Although not required, the Read Controller Clock Response message can have a form as shown in the example of FIG. 2B, e.g., a data structure 210 having a frame header 211 of eight bytes, a CRC field 215 of four bytes, and a Read Clock Response field 213 of twelve bytes.

Figure 2C:
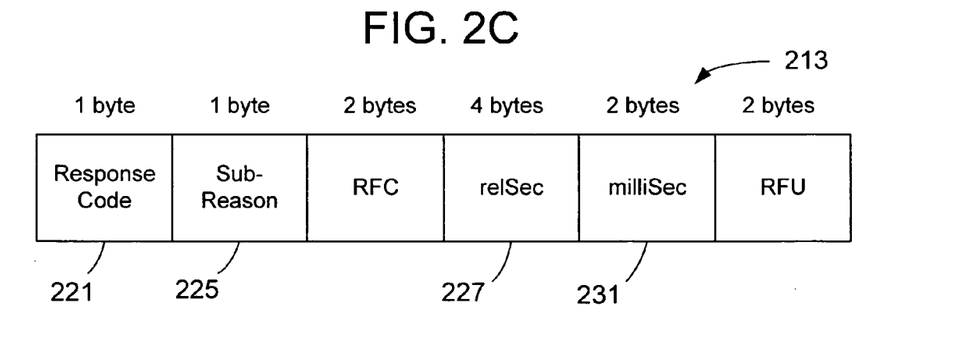
FIG. 2C is a data structure diagram of a Read Clock Response field of the Read Clock Response message of FIG. 2B.

In the example of FIG. 2C, the Read Clock Response field 213 further comprises several fields of interest including a Response Code field 221, a Sub-Reason field 225, a rough time field, e.g., a relSec field 227, and a fine time field, e.g., a milliSec field 231. The Response Code field 221 indicates the success or failure of the request. For example, a value of zero may indicate that the request was successfully completed. If the request fails, then the Sub-Reason field 225 gives additional information about the failure of the request.

The relSec field 227 conveys the current controller system time expressed in relative seconds. For example, with respect to the Tricon system, relative seconds are expressed as seconds past 00:00 Jan. 1, 1970, based on local time. For the Trident system, relative seconds are expressed as seconds past 00:00 Jan. 1, 1970 based on universal time (Greenwich Mean Time). The milliSec field 231 conveys the number of milliseconds past the indicated second in the relSec field 227.

The Adjust Controller Clock message is sent to request that the controller's time be adjusted either forward or backward. The controller responds with an Adjust Controller Clock Response message. With some systems, certain preconditions must be met in order for an Adjust Controller Clock message to succeed. For example, in the Tricon system, the keyswitch must be in Program mode. For Trident, the operational mode must be set to Program. Moreover, for Tricon, the controller does not allow an application or an external device to set the time continuously, and at least five minutes must pass before the controller will respond to an Adjust Controller Clock message. If the application program sends this message before five minutes pass, the message is rejected.

Figure 3A:
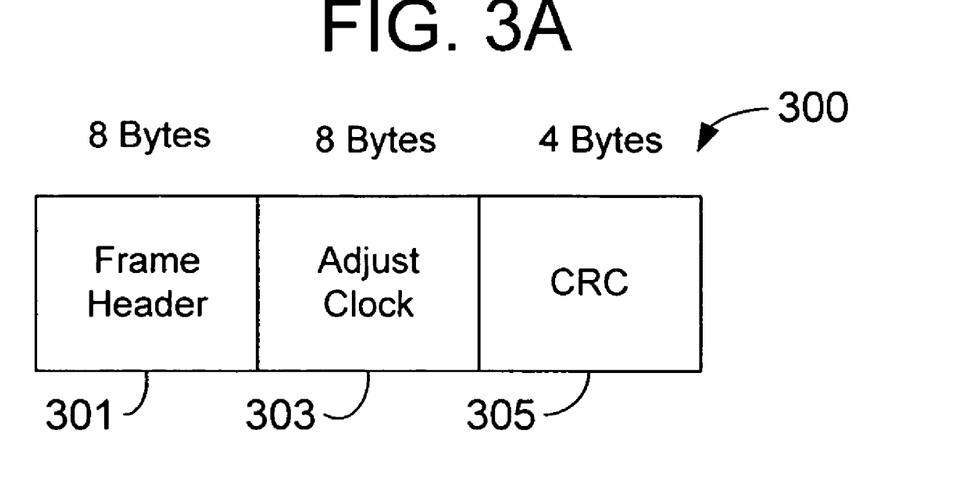
FIG. 3A is a packet data structure diagram of an Adjust Clock message usable in an embodiment of the present invention.
Figure 3B:
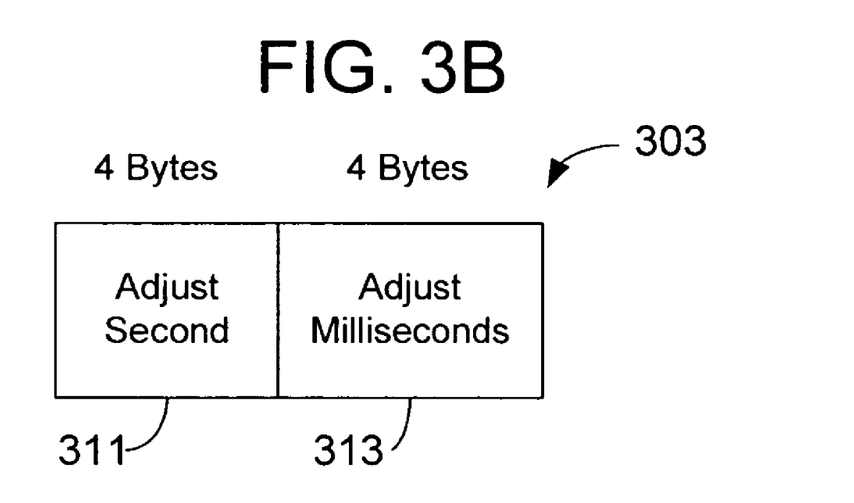
FIG. 3B is a data structure diagram of an Adjust Clock field of the Adjust Clock message of FIG. 3A.

An example of an Adjust Controller Clock message 300 is illustrated in FIG. 3A and includes an eight-byte Frame Header field 301, a four-byte CRC field 305, and an eight-byte Adjust Clock field 303. The Adjust Clock field 303 further comprises (see FIG. 3B) a four-byte Adjust Second field 311 and a four-byte Adjust Milliseconds field 313. The Adjust Second field 311 contains a signed number indicating the number of seconds to adjust the clock either forward or backward. The Adjust Milliseconds field 313 contains a signed number indicating the number of milliseconds to adjust the clock either forward or backward.

Figure 4A:
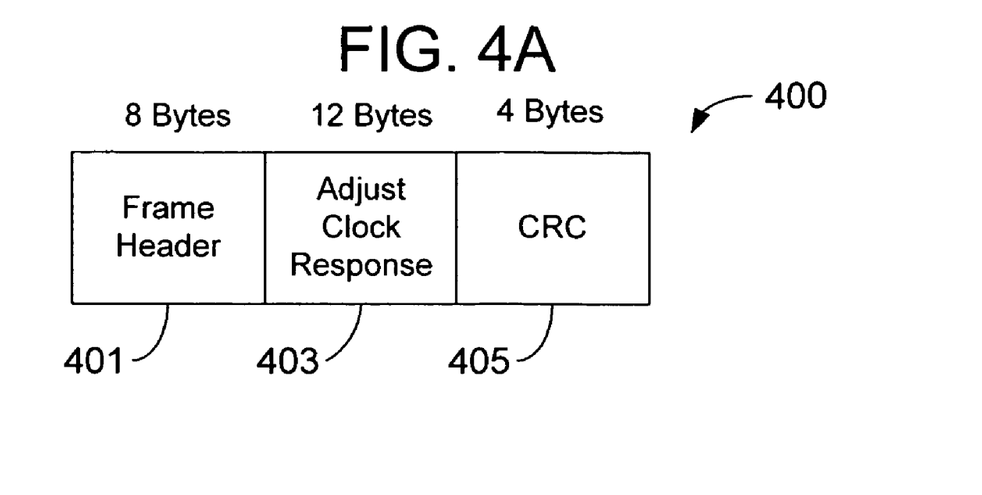
FIG. 4A is a packet data structure diagram of an Adjust Clock Response message usable in an embodiment of the present invention.
Figure 4B:
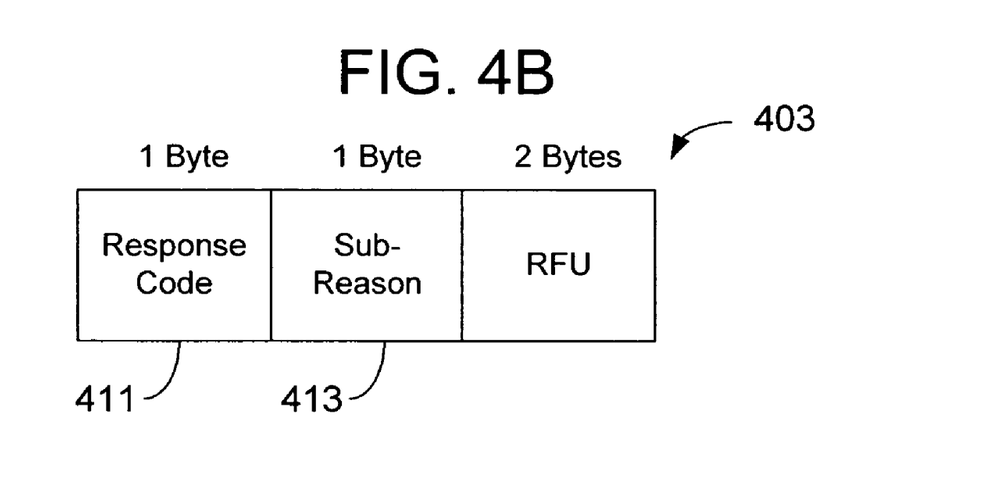
FIG. 4B is a data structure diagram of an Adjust Clock Response field of the Adjust Clock Response message of FIG. 4A.

In response to receipt of an Adjust Controller Clock message, the controller replies with an Adjust Controller Clock Response message which indicates success or failure of the request. In the example of FIG. 4A, the Adjust Controller Clock Response message 400 includes an eight-byte Frame Header field 401, a four-byte CRC field 405, and a twelve-byte Adjust Clock Response field 403. As illustrated in the example of FIG. 4B, the Adjust Clock Response field 403 further comprises a one-byte Response Code field 411 and a one-byte Sub-Reason field 413.

The Response Code field 411 indicates the success or failure of the request. For example, a value of zero may indicate that the request was successfully completed. In the event that the request fails, the Sub-Reason field 413 contains additional information about the failure of the request.

As noted above, in existing controller systems, such as the Tricon and Trident systems, the protocol handlers may be modified to accommodate the time-synchronization system described herein. For example, in the Tricon system, the class ProtocolHandlerTriconSOE may be modified.

In the Trident system, the class ProtocolHandlerTridentSOE derives from ProtocolHandlerTriconSOE but only implements those function codes that are not used in the Tricon protocol handler. It parses the header portion of each TSAA message, handling the bytes in a format that is reverse endian from that used in the Tricon protocol handler.

In an embodiment of the present invention, the modifications and additions to ProtocolHandlerTriconSOE include adding support for the extraction of a time-synchronization specification from the device options provided. For example, the device options can specify the minute of the hour when time synchronization is to be executed, and the protocol handler should extract this value.

In a further embodiment of the present invention, the modifications and additions to ProtocolHandlerTriconSOE include adding a routine that runs periodically, e.g., once every sixty seconds. In an embodiment of the present invention, this routine causes the base to pulse a Send() method of the protocol handler each time the driver should check to see if the current minute matches the minute specified to begin the time-synchronization process.

To ensure that the minute is not missed, the Send() method activates the time-synchronization process when the current minute is greater than or equal to the minute specified to begin the time-synchronization process. In a further embodiment, once the time-synchronization process is activated, it is not re-run until the next time the current minute is greater than or equal to the minute specified to begin the time-synchronization process. This is accomplished, e.g., by only enabling the time-synchronization process when the minute is reset to zero (or on startup). Once the process begins, an enable flag is set to false, preventing another run; the enable flag is reset to true when the minute value changes to zero.

Figure 5:
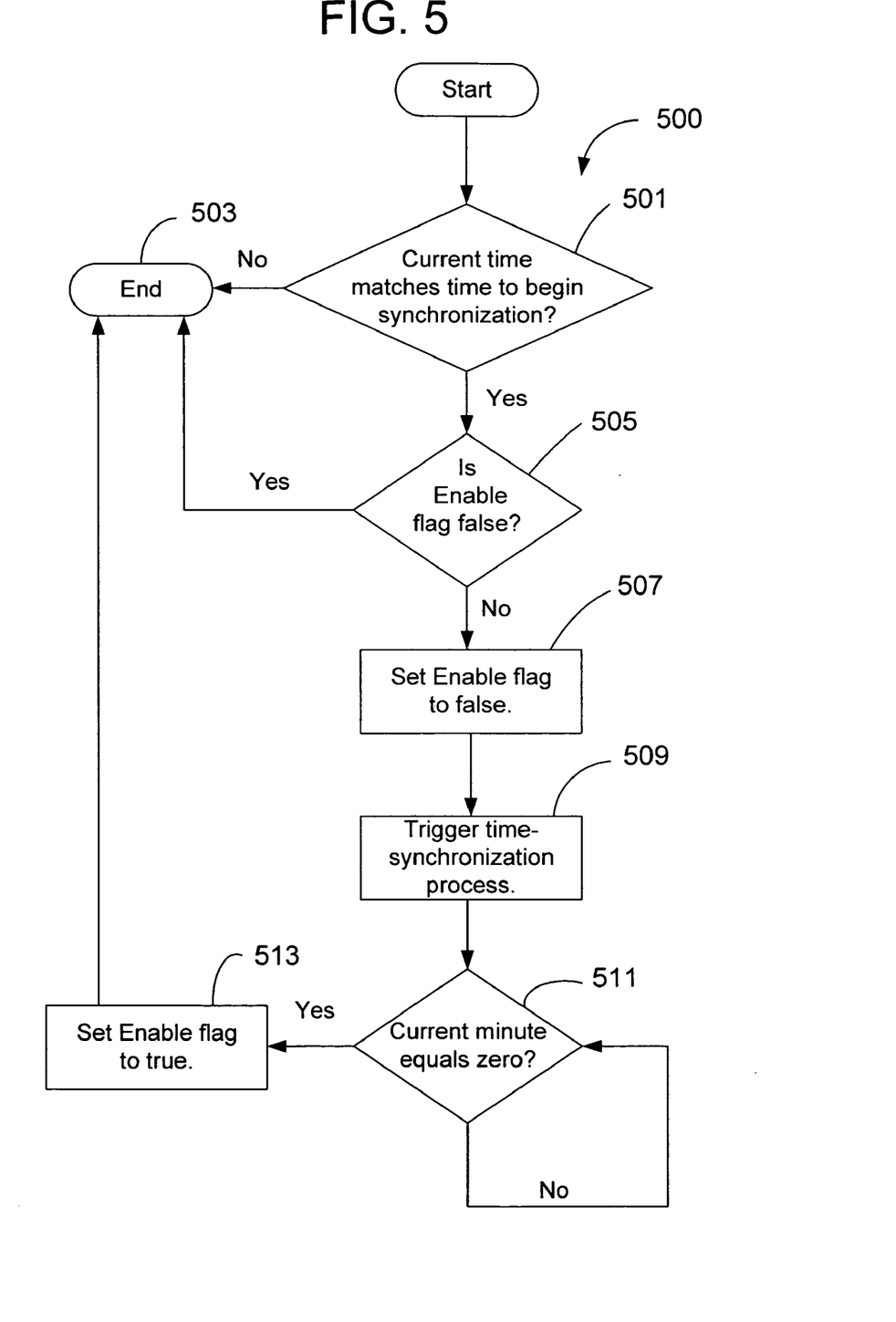
FIG. 5 is a flowchart of a process for determining when to trigger a time-synchronization operation in an embodiment of the present invention.

The flowchart 500 of FIG. 5 provides an example of how to determine when to start the time-synchronization process. At step 501, the driver checks to see whether the current time matches a time selected to begin the time synchronization. If the current time does not match the selected time in step 501, then the process terminates in step 503.

Otherwise, the process continues to step 505. At step 505, the driver determines whether an Enable flag is set to false. If the Enable flag is false, then the process terminates in step 503.

If the Enable flag is true in step 505, then in step 507 the driver sets the Enable flag to false and continues to step 509.

In step 509, the driver triggers the time-synchronization process, an example of which is discussed in greater detail below. When the time-synchronization process is complete, the process continues to step 511. At step 511, the process periodically checks the current minute to determine whether it is set to zero. As long as the current minute is not set to zero, step 511 repeats.

When the current minute becomes zero in step 511, the process continues to step 513 where the driver sets the Enable flag to true. Then the process terminates at step 503.

As noted above, the process illustrated in FIG. 5 preferably runs periodically, such as every sixty seconds. This, coupled with the setting and resetting of the Enable flag based on the passage of that period of time, ensures that the minute for synchronization is not missed, while at the same time avoiding repeat executions of the time synchronization.

Once the time-synchronization process is triggered at step 509, the workstation or other computing device providing time synchronization to another device, e.g., a controller, determines whether time synchronization is needed and provides time synchronization in accordance with that determination.

Figure 6:
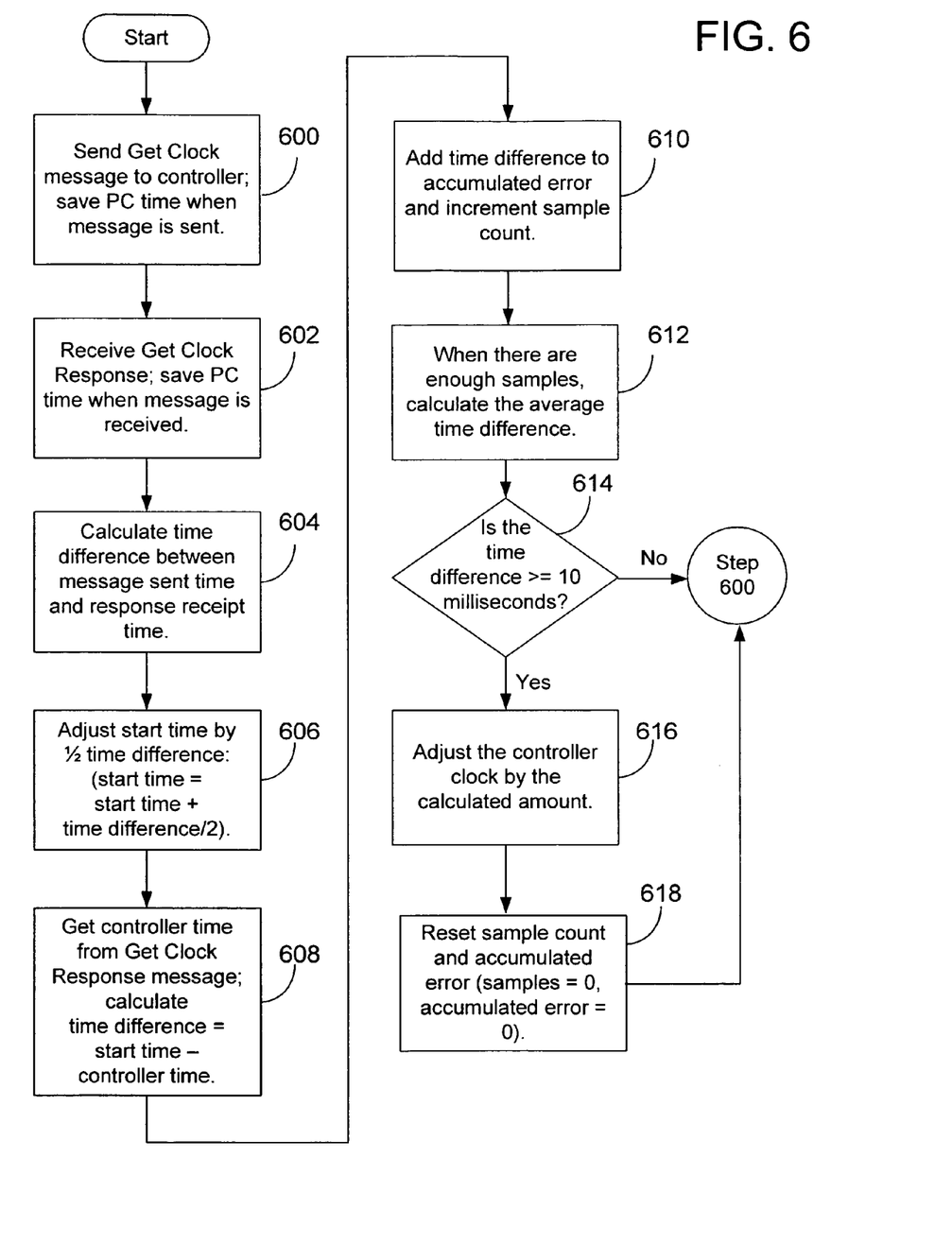
FIG. 6 is a flowchart of a process of time synchronization according to an embodiment of the present invention.

An example time-synchronization technique according to an embodiment of the present invention is illustrated in FIG. 6. The illustrated process is executed for each link when triggered. For example, the illustrated process is executed between the workstation 103A and the Tricon controller 109 when the workstation 103A is triggered to provide time synchronization. Likewise, the illustrated process is executed between the workstation 103B and the Tricon controller 109 when the workstation 103B is triggered to provide time synchronization. As discussed later, the synchronization activities of the redundant workstations 103A, 103B are preferably staggered and do not interfere with one another.

The manner in which the time-synchronization operation is executed for each link is set forth in the flow chart of FIG. 6. At step 600, a workstation sends a Get Clock message to a controller. When sending this message, the workstation saves the local time (i.e., the time according to the workstation clock) when the message is sent. This time is referred to below as the "StartTime."

At step 602, the workstation receives a Get Clock Response from the controller and saves the local time (i.e., the time according to the workstation clock) when the message is received. This time is referred to below as the "EndTime."

At step 604, the workstation calculates the time difference between when the Get Clock message was sent to the controller and when the Get Clock Response was received from the controller. To calculate this value, the workstation subtracts the StartTime from the EndTime (TimeDifference=EndTime−StartTime).

Although the time delays between the workstation and the controller may not always be known in both directions, in an embodiment of the present invention, an approximation is used to establish the time at the local workstation at which time the Get Clock Response was sent from the controller. In particular, it is generally reasonable to assume that the Get Clock response was sent from the controller at a time halfway between the sent and received times at the workstation. Thus at step 606, based on this assumption, the workstation adjusts the StartTime by half of the TimeDifference as defined above (StartTime=StartTime+TimeDifference/2).

At step 608, the workstation gets the controller time from the Get Clock Response message (ControllerTime), calculates the difference between the adjusted PC start time and the controller time (TimeDifference=StartTime−ControllerTime). At step 610, the workstation adds the TimeDifference to an AccumulatedError and increments a "Samples" value (Samples=Samples+1).

When enough samples have been accumulated, for example, twenty samples in an embodiment of the present invention (Samples>=20), then at step 612, the workstation calculates the average time difference (TimeDifference=AccumulatedError/Samples). At step 614, if the calculated difference exceeds a predetermined threshold of acceptable difference, e.g., 10 milliseconds (TimeDifference>=10), then the workstation adjusts the controller clock by the calculated amount at step 616. Otherwise, the workstation returns to step 600. At step 618, the workstation resets the sample count and accumulated error (Samples=0, AccumulatedError=0).

Figure 7:
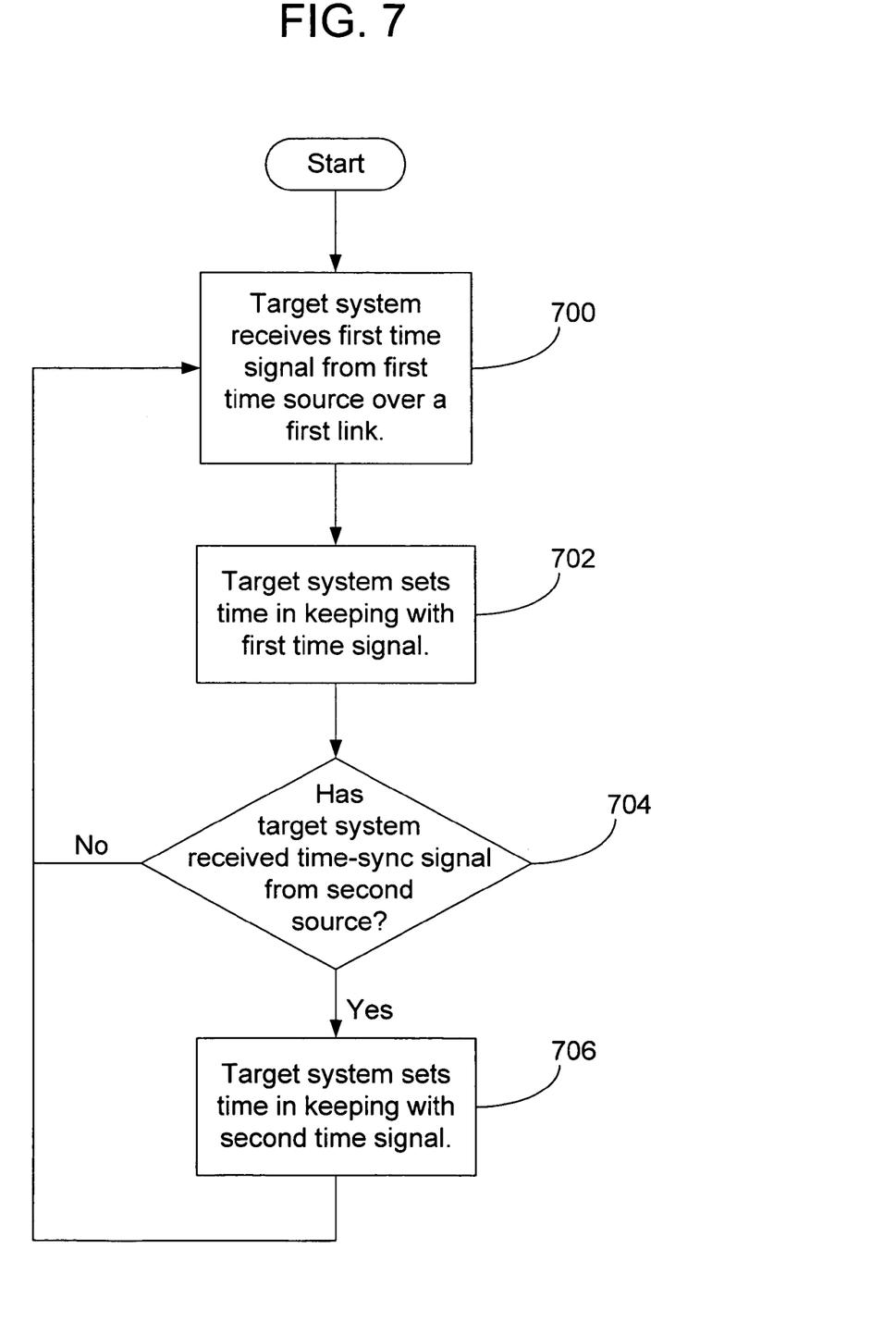
FIG. 7 is a flowchart of a process for avoiding collisions among multiple time keepers during synchronization.

Having described the process by which each link is updated individually, an exemplary method for coordinating the updating activities of multiple links is shown in FIG. 7. In general, the algorithm assures redundant but non-interfering time synchronization by having both workstations send their times once per hour but at times that are separated by a half hour. For example, if one workstation sends the time on the fourth minute of the hour, then the other sends it on the thirty fourth minute of the hour. If either link goes down, the time-synchronization process remains operational. When both links are operational, they do not confuse the Tricon controller with contemporaneous and inconsistent time settings because they are configured to send time thirty minutes apart.

In step 700, the target system (e.g., the controller to be synchronized) receives a first time-synchronization signal from a first time source, such as a workstation, over a first link. At step 702, the target system sets its time in keeping with the received time-synchronization signal. At decision step 704, the target system determines whether it has received, within a predetermined amount of time after receiving the first time signal, a second time-synchronization signal from a second time source, such as a second workstation, over a second link. If so, then the target sets its time in keeping with the second time-synchronization signal at step 706. Otherwise, the process returns to step 700.

It should be noted that the target controller need not know if it is receiving time-synchronization requests from one workstation or from more than one. Whenever it receives an Adjust Clock command, it synchronizes its time. Moreover, if one of the redundant links goes down, the only affect on the controller time synchronization would be less frequent updating, which should generally be well tolerated depending upon the rate at which the controller clock drifts.

Although the described examples show a workstation in communication with a time source, and the same workstation performs the time synchronization with the controller or other device, it will be appreciated that this simplified architecture is not required by the invention and that timekeeper workstations may instead be indirectly linked to the time source. Moreover, although the illustrated examples show a single machine performing the synchronization for each link, it will be appreciated that multiple machines may participate in aspects of time checking and synchronization on a given link, either by sharing tasks or by acting independently in parallel for increased redundancy.

Moreover, although an independent time source is shown, in an embodiment of the present invention the time source is part of one subnet or the other. In an alternative embodiment, each subnet has a time source, with one being designated as primary and the other as backup. In this embodiment, the primary time source supplies all necessary timing signals as long as it is functioning properly. If it fails to function properly, then the backup time source is used instead.

Moreover, although the illustrated examples show dual redundancy time synchronization, it will be appreciated that the principles of the invention apply as well to higher order redundancies such as triple redundancy or quadruple redundancy.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details are determined by specific situations. Therefore, the invention as described herein contemplates all such embodiments as may come within the scope of the following claims and equivalents thereof.

We claim:

1. A method for synchronizing a clock of a workstation with a clock of a controller, the method comprising:
    sending, by the workstation, a read-clock request message to the controller;
    receiving, by the workstation, a read-clock response message from the controller;
    extracting a time from the read-clock response message;
    calculating an approximate time, according to the clock of the workstation, when the read-clock response message was sent by the controller;
    calculating a time difference between the extracted time and the approximate time;
    accumulating the calculated time difference to an accumulated time difference;
    incrementing a sample counter;
    when the sample counter exceeds a predetermined counter threshold, calculating an average time difference from the accumulated time difference; and
    if the average time difference exceeds a predetermined time-difference threshold, then requesting that the controller adjust its timer.

2. The method for synchronizing a clock of a workstation with a clock of a controller of claim 1 wherein calculating an approximate time, according to the clock of the workstation, when the read-clock response message was sent by the controller comprises:
    subtracting a time, according to the clock of the workstation, when the read-clock request message was sent from the time, according to the clock of the workstation, when the read-clock response message was received;
    adding half of a result of the subtracting to the time, according to the clock of the workstation, when the read-clock request message was sent; and
    taking a result of the adding as the approximate time, according to the clock of the workstation, when the read-clock response message was sent by the controller.

3. The method for synchronizing a clock of a workstation with a clock of a controller of claim 1 wherein the predetermined counter threshold is less than one.

4. The method for synchronizing a clock of a workstation with a clock of a controller of claim 1 wherein requesting that the controller adjust its timer comprises:
    sending, by the workstation, an adjust-clock request message to the controller; and
    receiving, by the workstation, an adjust-clock response message from the controller.

5. The method for synchronizing a clock of a workstation with a clock of a controller of claim 1 further comprising:
    periodically repeating the procedure of claim 1.

6. The method for synchronizing a clock of a workstation with a clock of a controller of claim 1 further comprising:
    if the average time difference exceeds a predetermined time-difference threshold, then setting the sample counter to zero and setting the accumulated time difference to zero.

7. A method for synchronizing a clock of a first workstation with a clock of a controller and for synchronizing a clock of a second workstation with the clock of the controller, the method comprising:
    periodically, upon reaching a first predetermined time, calculating, by the first workstation, an approximate time difference between the clock of the first workstation and the clock of the controller;
    if the calculated approximate time difference between the clock of the first workstation and the clock of the controller exceeds a first predetermined time-difference threshold, then requesting that the controller adjust its timer;
    periodically, upon reaching a second predetermined time, calculating, by the second workstation, an approximate time difference between the clock of the second workstation and the clock of the controller; and
    if the calculated approximate time difference between the clock of the second workstation and the clock of the controller exceeds a second predetermined time-difference threshold, then requesting that the controller adjust its timer;
    wherein the first predetermined time is staggered relative to the second predetermined time.

8. The method for synchronizing a clock of a first workstation with a clock of a controller and for synchronizing a clock of a second workstation with the clock of the controller of claim 7 wherein calculating, by the first workstation, an approximate time difference between the clock of the first workstation and the clock of the controller comprises:
    sending, by the first workstation, a read-clock request message to the controller;
    receiving, by the first workstation, a read-clock response message from the controller;
    extracting a time from the read-clock response message;
    calculating an approximate time, according to the clock of the first workstation, when the read-clock response message was sent by the controller; and
    calculating a time difference between the extracted time and the approximate time.

9. A method for synchronizing a clock of a first workstation with a clock of a controller and for synchronizing a clock of a second workstation with the clock of the controller, the method comprising:
    receiving, by the controller, an adjust-clock request message from the first workstation;

adjusting the clock of the controller, the adjusting based, at least in part, on the adjust-clock request message received from the first workstation;

sending, by the controller, an adjust-clock response message to the first workstation;

receiving, by the controller, an adjust-clock request message from the second workstation;

adjusting the clock of the controller, the adjusting based, at least in part, on the adjust-clock request message received from the second workstation; and sending, by the controller, an adjust-clock response message to the second workstation.

\* \* \* \* \*